United States Patent
Arvidson

[15] 3,680,310
[45] Aug. 1, 1972

[54] STARTING DEVICE FOR MONOPROPELLANT GAS GENERATOR

[72] Inventor: Carl D. Arvidson, Flanders, N.J.

[73] Assignee: The United States of America as represented by the Secretary of the Navy

[22] Filed: May 19, 1967

[21] Appl. No.: 642,646

[52] U.S. Cl..............................60/39.48, 102/49.8
[51] Int. Cl..............................................F02c 3/12
[58] Field of Search.......................60/39–48, 259; 102/49.8

[56] References Cited

UNITED STATES PATENTS 2,954,670  10/1960  Helus et al......................60/259
3,230,703  1/1966  Sherman.......................60/39.48

FOREIGN PATENTS OR APPLICATIONS 695,048  8/1953  Great Britain...............60/39.48

*Primary Examiner*—Samuel Feinberg
*Attorney*—George J. Rubens, H. H. Losche and Paul S. Collignon

[57] ABSTRACT

A starting device for a monopropellant gas generator of a boot-strap type having a metallic seal closing the monopropellant chamber comprising first and second concentrically mounted differential area piston with said first differential area piston being utilized to penetrate said metallic seal and initiate propellant flow and said second differential area piston being utilized to sustain pressure within said monopropellant chamber.

3 Claims, 4 Drawing Figures

INVENTOR.
CARL ARVIDSON

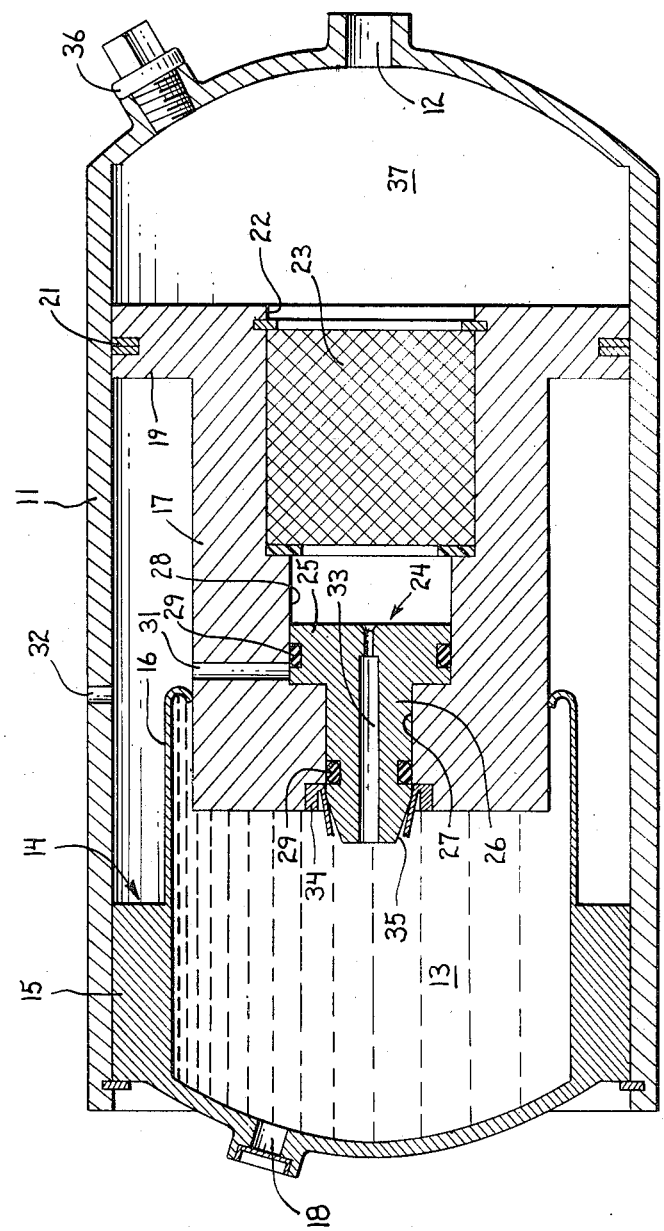

STARTING DEVICE FOR MONOPROPELLANT GAS GENERATOR

BACKGROUND OF THE INVENTION

The present invention relates to an improvement in a monopropellant gas generator which utilizes a differential area piston to provide self-pressurization. There has been increased use of differential area pistons in gas generators as these pistons eliminate the use of complicated fluid pumping means. One problem that still is troublesome, however, has been that of sealing the propellant chamber until the gas generator is started operating.

In U.S. Pat. No. 2,918,791, which issued Dec. 29, 1959, to Leonard Greiner, there is shown a rocket or missile that utilizes a differential area piston for transmitting pressure from a pressure generating chamber to a gas generating chamber to effect injection of the gas generate from the gas generate chamber into the pressure generating chamber. In this patent, a nozzle connects a combustion chamber with a chamber that stores the gaseous or liquid monopropellant, and a spring-urged ball check is utilized to prevent loss of propellant during storage or shipment.

In U.S. Pat. No. 3,011,312, which issued Dec. 5, 1961, to John Black, another propulsion system is described which also utilizes monopropellant. In this patent, the chamber containing the liquid monopropellant is connected to a thrust chamber by an orifice that is closed by a burst disc. When the system is started by an igniter system, a differential piston moves into the liquid monopropellant chamber causing the pressure to increase thereby rupturing the burst disc.

Both the spring-urged ball check and the burst disc heretofore employed in monopropellant generators present a safety hazard, particularly when the generators are used as engines for rockets that might carry an explosive charge, as shown in U.S. Pat. No. 2,918,791, which issued to Leonard Greiner. In the event that the gas generator would be subjected to an elevated temperature, an increased gas pressure could cause a disc to burst, or in the ball check device, the spring pressure could be overcome, and the gas generator could start inadvertently, and once started, most devices are self-sustaining. Accordingly, the choice of monopropellant is greatly limited when such pressure actuated devices are employed, as the monopropellant must be selected so that any decomposition pressure occuring during storage does not activate the device.

SUMMARY OF THE INVENTION

In the present invention, the outlet opening from the chamber containing the monopropellant is closed by an aluminum seal which has sufficient thickness and strength to withstand any increase in pressure within the monopropellant chamber due to decomposition. A small secondary differential area piston is slidably mounted within the main differential area piston and, upon activation of an igniter, the secondary differential area piston is slidably actuated and penetrates the metallic seal. This secondary differential area piston is provided with a through orifice which then serves as the orifice connecting the monopropellant chamber and the combustion chamber.

It can thus be seen that the present invention provides an improved device for starting a self-sustaining monopropellant gas generator that greatly enhances the safety of the system. It is therefore a general object of the present invention to provide improved means for initiating the operation of a self-sustaining monopropellant gas generator.

Other objects and advantages of the present invention will be readily appreciated as the same becomes better understood by reference to the following detailed description when considered in connection with the accompanying drawing.

BRIEF DESCRIPTION OF THE DRAWING

FIG. 3 is a perspective view of the differential area piston that penetrates the chamber seal; and FIG. 4 is a sectional view similar to FIG. 2 of the drawing, showing the gas generator in operation.

DESCRIPTION OF THE PREFERRED EMBODIMENT

Figure 2:
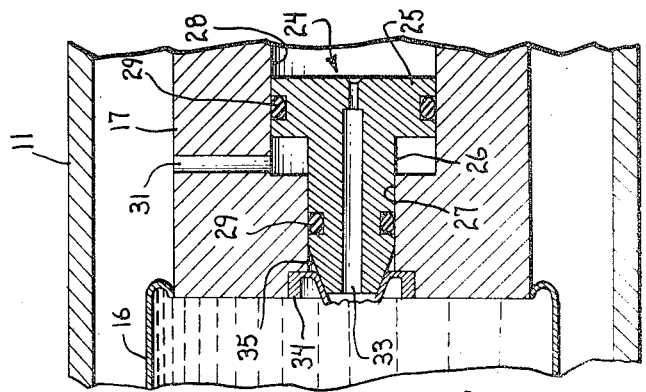
FIG. 2 is a partial sectional view showing a differential area piston penetrating a seal of a monopropellant chamber.

Referring now to the drawing, there is shown a casing 11 that could be part of a larger assembly of a motor, rocket, missile, or the like. The casing 11 is provided with a gas outlet 12 which connects to some utilization device, not shown, such as a nozzle of an engine.

A monopropellant chamber 13 is formed by housing 14 which is comprised of an enlarged section 15, which seats within casing 11, and a thinner section 16, one end of which engages in sealing relation with a differential area piston 17. By way of example, chamber 13 might contain a monopropellant such as either $N_2H_4$ or $N_2H_4 - HN - H_2O$, and the monopropellant is loaded into chamber 13 through opening 18, which is then closed by any suitable means.

The differential area piston 17 is provided with an enlarged diameter portion 19 which is slidably engageable with the inside diameter surface of casing 11. The enlarged diameter portion 19 is provided with suitable gaskets or piston rings 21 to prevent leakage of gas between portion 19 and casing 11. Differential area piston 17 is provided with an enlarged diameter bore 22 in which a suitable catalyst bed 23 is provided through which, in operation, the monopropellant from chamber 13 passes. By way of example, the catalyst bed might be $I_2O_5$ (initiator) — Thermal Bed (copper).

A secondary differential area piston 24 is positioned concentrically within differential area piston 17, and the secondary differential area piston 24 is provided with a large diameter portion 25 and a smaller diameter portion 26. The smaller diameter portion 26 is slidable in a bore 27 that opens into chamber 13 and the large diameter portion is slidable in a large bore 28 in differential area piston 17. The large diameter portion 25 and the smaller diameter portion 26 are each provided with sealing means 29, such as O-rings, to prevent gas leakage. Piston 17 is provided with an opening 31 that communicates between bore 28 and the inside of casing 11 to prevent entrapment of air in bore 28 when piston 24 is moved toward chamber 13. Likewise, casing 11 is provided with an opening 32 to prevent entrapment of air when piston 17 moves.

Figure 1:
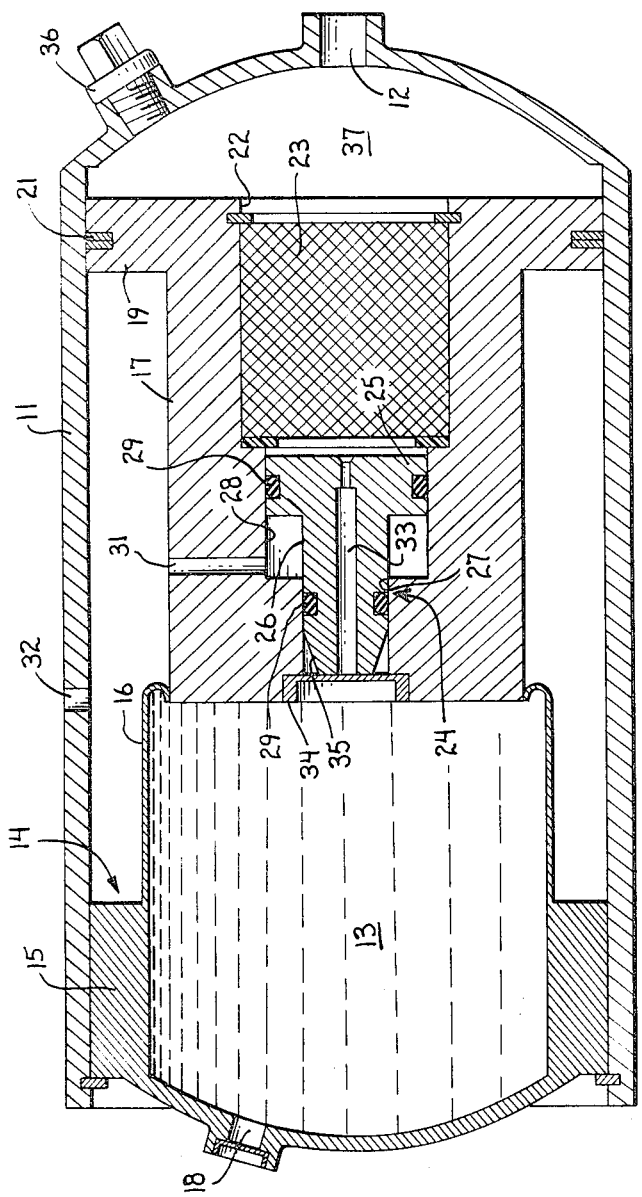
FIG. 1 is a sectional view showing a monopropellant gas generator in an inoperative or stored condition.

Referring now to FIGS. 1 and 3 of the drawing, it can be that the secondary differential area piston 24 is provided with a through orifice 33 and that a closure 34 of suitable material, such as soft aluminum, is provided to prevent the flow of monopropellant from chamber 13 through orifice 33. The smaller diameter portion 26 of piston 24 is provided with a tapered end 35 to facilitate the penetration of piston 24 through closure 34 when the gas generator is started.

Prior to operation, such as when the system is in storage, closure 34 prevents any monopropellant from passing through orifice 33 and into the catalyst bed 23. When it is desired to start the gas generator, a start igniter 36 is fired and the increase in pressure within chamber 37 causes differential area piston 24 to penetrate closure 34 and thus allow the monopropellant to flow through orifice 33 into the catalyst bed 23. By way of example, start igniter 36 might be comprised of a squib which is adapted to fire into a solid grain charge. The tapered end 35 of piston 24 causes closure 34, which is of soft aluminum, to lay against the smaller diameter portion 26 and thus there are no small broken pieces of the closure to plug orifice 33. Once the monopropellant starts flowing from chamber 13 through orifice 33 and then into the catalyst bed 23, the pressure within chamber 37 is increased which causes differential area piston 17 to start moving into chamber 13 and, accordingly, the pressure within chamber 13 is maintained at a sufficiently high value so that all of the monopropellant is passed through orifice 33.

It can thus be seen that the present invention permits a chamber containing monopropellants to be hermetically sealed until the monopropellants are utilized in a gas generator. Obviously many modifications and variations of the present invention are possible in the light of the above teachings. It is therefore to be understood, that within the scope of the appended claims, the invention may be practiced otherwise than as specifically described.

I claim:

1. A gas generating system comprising:
   a gas generating chamber having an exhaust outlet,
   a monopropellant chamber
   a first differential area piston having large and small surface area, said large surface area forming one wall of said gas generating chamber and said small surface area forming one wall of said monopropellant chamber,
   a passageway through said first differential piston,
   a second differential area piston having large and small surface areas and being slidably mounted in said passageway of said first differential area piston, said large surface area of said second differential area piston being in communication with said gas generating chamber,
   an orifice through said second differential area piston, and
   a metallic seal closing said passageway through said first differential area piston at said small surface area of said first differential pressure area whereby said monopropellant chamber is hermetically sealed, said small surface of said second differential area piston being in contact with said metallic seal and being adaptable for shearing said seal whereby monopropellant within said monopropellant chamber flows through said orifice of said second differential area piston into said gas generating chamber.

2. A gas generating system as set forth in claim 1 wherein said second differential area piston is comprised of an enlarged diameter portion and a reduced diameter portion having a tapered section terminating to form said small surface area whereby said tapered section facilitates shearing of said metallic seal.

3. A gas generating system as set forth in claim 1 wherein a starting means is provided within said gas generating chamber for creating an initial pressure for slidably actuating said second differential area piston to shear said metallic seal.

* * * * *